(12) United States Patent
Gunderson et al.

(10) Patent No.: US 6,499,005 B2
(45) Date of Patent: *Dec. 24, 2002

(54) SYSTEM AND METHOD FOR SIMULATING AIR MODE AND GROUND MODE OF AN AIRPLANE

(75) Inventors: Denis P. Gunderson, Duvall, WA (US); Todd B. Brouwer, Duvall, WA (US); Launa B. Molsberry, Kent, WA (US)

(73) Assignee: The Boeing Company, Seattle, WA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 123 days.

(21) Appl. No.: 09/187,752

(22) Filed: Nov. 9, 1998

(65) Prior Publication Data

US 2001/0012989 A1 Aug. 9, 2001

Related U.S. Application Data

(60) Provisional application No. 60/065,024, filed on Nov. 10, 1997.

(51) Int. Cl.[7] .............................. G06G 7/48; G09B 9/00; G06F 17/00; G01R 33/00; H03K 19/00; B64C 25/10

(52) U.S. Cl. .............................. 703/8; 434/30; 434/35; 701/3; 702/119; 702/120; 244/102 R

(58) Field of Search .............................. 703/8; 434/35, 434/30; 702/169–120; 701/3; 244/102 R

(56) References Cited

U.S. PATENT DOCUMENTS 3,602,207 A * 8/1971 Kilmer ..................... 123/179.1
3,815,262 A * 6/1974 Patterson et al. ............. 434/35
3,920,204 A * 11/1975 Bissell et al. ................ 244/111
4,007,970 A * 2/1977 Romero ....................... 303/126
4,043,526 A * 8/1977 Donley et al. ............... 244/194
4,055,801 A * 10/1977 Pike et al. ................... 714/736

(List continued on next page.)

FOREIGN PATENT DOCUMENTS

AT          0915011 A2 *  5/1999
EP          0 739 817 A2  10/1996
EP          0 739 817 A3   5/1997

*Primary Examiner*—Hugh M. Jones
(74) *Attorney, Agent, or Firm*—Black Lowe & Graham PLLC

(57) ABSTRACT

A system for enabling an operator to select a signal indicative of an air mode and a ground mode of an airplane is provided. The air mode is a state of the airplane when the airplane is in the air, and the ground mode is a state of the airplane when the airplane is on the ground. The system includes a plurality of sensors that sense parameters indicative of whether the airplane is sensed in the air or sensed on the ground. Sensed mode logic that determines whether the airplane is sensed in the air or sensed on the ground is provided, The sensed mode logic generates a signal indicative of a sensed ground mode when at leant two sensors indicate the airplane is sensed on the ground. The sensed mode logic generates a signal indicative of a sensed air mode when less than two sensors indicate the airplane is sensed on We ground. An operator interface is also provided. A simulated air mode and a simulated ground mode are selectable via the operator interface. Override control logic outputs a signal indicative of the ground mode when either the sensed mode logic outputs a signal indicative of a sensed ground mode or the operator selectable ground mode is selected and the operator selectable air mode is not selected. The override control logic outputs a signal indicative of the air mode when either the sensed mode logic generates a signal indicative of a sensed air mode or the operator selectable air mode is selected and the operator selectable ground mode is not selected.

6 Claims, 5 Drawing Sheets

U.S. PATENT DOCUMENTS

| | | | |
|---|---|---|---|
| 4,338,553 A | * | 7/1982 | Scott ........................... 318/266 |
| 4,553,474 A | * | 11/1985 | Wong et al. ................... 454/74 |
| 4,573,649 A | * | 3/1986 | Yourkowski et al. ..... 244/102 R |
| 4,799,220 A | * | 1/1989 | Nielsen ....................... 714/736 |
| 4,821,217 A | * | 4/1989 | Jackson et al. ................. 701/3 |
| 4,841,456 A | * | 6/1989 | Hogan et al. ............... 702/119 |
| 4,915,326 A | * | 4/1990 | Plude ...................... 244/129.5 |
| 5,009,598 A | * | 4/1991 | Bennington ................... 434/30 |
| 5,023,791 A | * | 6/1991 | Herzberg et al. ............. 701/35 |
| 5,111,402 A | * | 5/1992 | Brooks et al. ................. 701/35 |
| 5,161,158 A | * | 11/1992 | Chakravarty et al. ......... 714/26 |
| 5,260,874 A | * | 11/1993 | Berner et al. .................. 701/33 |
| 5,710,776 A | * | 1/1998 | Tomlinson et al. ......... 714/704 |
| 5,807,109 A | * | 9/1998 | Tzidon et al. ................. 434/35 |
| 5,868,359 A | * | 2/1999 | Cartmell et al. ............. 244/223 |
| 5,962,777 A | * | 10/1999 | Salamt et al. ................. 73/121 |
| 5,984,234 A | * | 11/1999 | Brouwer et al. ......... 244/129.5 |

\* cited by examiner

DOWN AND LOCKED

← FWD

DOWN AND LOCKED

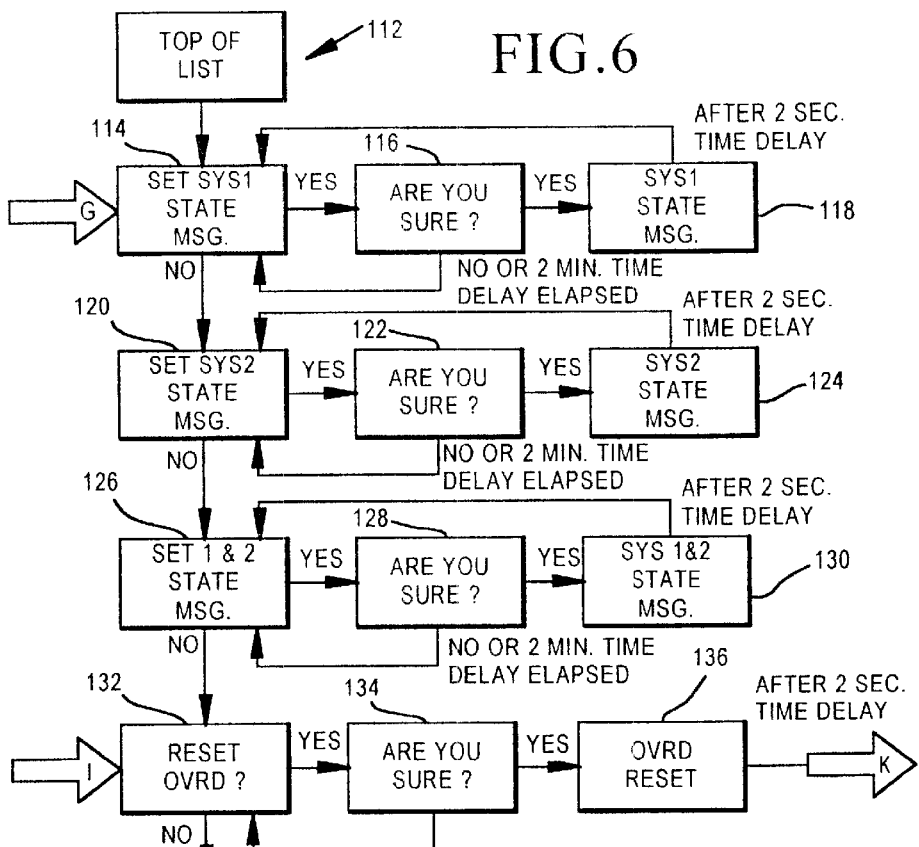

SYSTEM AND METHOD FOR SIMULATING AIR MODE AND GROUND MODE OF AN AIRPLANE

This application claims benefit of Ser. No. 60/065,024 filed Nov. 10, 1997.

BACKGROUND OF THE INVENTION

The invention relates to avionics and, more particularly, to a system and method for simulating air mode and ground mode of an airplane.

Maintenance procedures on airplane systems sometimes entail that the system be placed in a state that is indicative of the airplane being on the ground or in the air. The state indicative of the airplane being in the air is referred to as an "air mode," and the state indicative of the airplane being on the ground is referred to as "ground mode,"

Air mode and ground mode determinations are typically made from signals generated by sensors that sense parameters indicative of whether the airplane is in the air or on the ground. For example, typical sensors may include proximity sensors, such as variable reactance sensors, that are mounted on an airplane's main landing gear and nose gear, When the airplane is on the ground, the main landing gear and the nose gear compress due to the weight of the airplane. This compression brings a target mounted on the gear closer to its associated proximity sensor, and the proximity sensor outputs a signal that is indicative of the airplane being on the ground. When the airplane is in the air, the weight of the airplane is off the main landing gear and the nose gear, and the gear are no longer compressed, The target is displaced from the proximity sensor such that the proximity sensor no longer detects the presence of the target, and the proximity sensor outputs a signal that is indicative of the airplane being in the air.

Some maintenance procedures require that the air mode be simulated while the airplane is actually on the ground. In known air/ground systems, simulating an air mode when the airplane is on the ground entails overriding the proximity sensors. For example, it is known to insert a piece of aluminum between a variable reactance proximity sensor and its target. Placing aluminum between the variable reactance proximity sensor and its target lowers the inductive coupling between the proximity sensor and its target, such that the inductive coupling is about the magnitude of coupling that results when the airplane is in the air and the gear is not compressed. Thus, an air mode signal is simulated. However, insertion and alignment of the aluminum pieces before performance of the maintenance procedure, and removal of the aluminum pieces after completion of the maintenance procedure, introduce significant time and labor expenses.

Similarly, some aircraft maintenance procedures require the landing gear to be raised. Raising the landing gear while the airplane is on the ground requires that the airplane be supported by jacks. Such an evolution is time and labor intensive, and is preferably conducted in a sheltered environment, such as an airplane hangar. Because of time and schedule constraints, and because of considerable cost considerations, it is desirable to minimize time spent performing maintenance procedures in hangars.

However, in known systems, simulating a ground state entails inserting material, such as steel, to increase the inductive coupling of the variable reactance proximity sensors. Thus, the time and labor expenses associated with simulating air mode in known systems is also introduced when simulating ground mode in known systems. Therefore, known methods of simulating ground mode lengthen, rather than shorten, time spent in hangars while performing maintenance procedures.

There is thus an unmet need in the art for an airplane air/ground system that simulates an air mode and a ground mode without the time and labor expenses required to insert materials into the proximity sensors.

BRIEF SUMMARY OF THE INVENTION

The invention is a system and method for simulating an air mode and ground mode of an airplane. The system and method of the invention simulates an air mode and a ground mode without the time and labor expenses required by methods currently known in the art.

According to the invention, a system for simulating an air mode and a ground mode of an airplane is provided. The air mode is a state of the airplane when the airplane is in the air, and the ground mode is a state of the airplane when the airplane is on the ground, The system includes means for sensing parameters indicative of whether the airplane is sensed in the air or sensed on the ground. Means for determining whether the airplane is sensed in the air or sensed on the ground is provided. The determining means is responsive to the sensing means, and the determining means outputs a signal that is indicative of a sensed air mode or a sensed ground mode. Means for interfacing with an operator is also provided. A simulated air mode and a simulated ground mode are selectable via the interface means. Means for overriding the signal output from the determining means i.% provided and the overriding means outputs a signal that is indicative of the simulated air mode or the simulated ground mode in response to a selection from the interface means. The overriding means outputs a signal that is indicative of the sensed air mode or the sensed ground mode when the simulated air mode or the simulated ground mode is not selected.

BRIEF DESCRIPTION OF THE SEVERAL VIEWS OF THE DRAWING

FIG. 6 is a flow chart of a software routine that implements the invention.

DETAILED DESCRIPTION OF THE INVENTION

Figure 1:
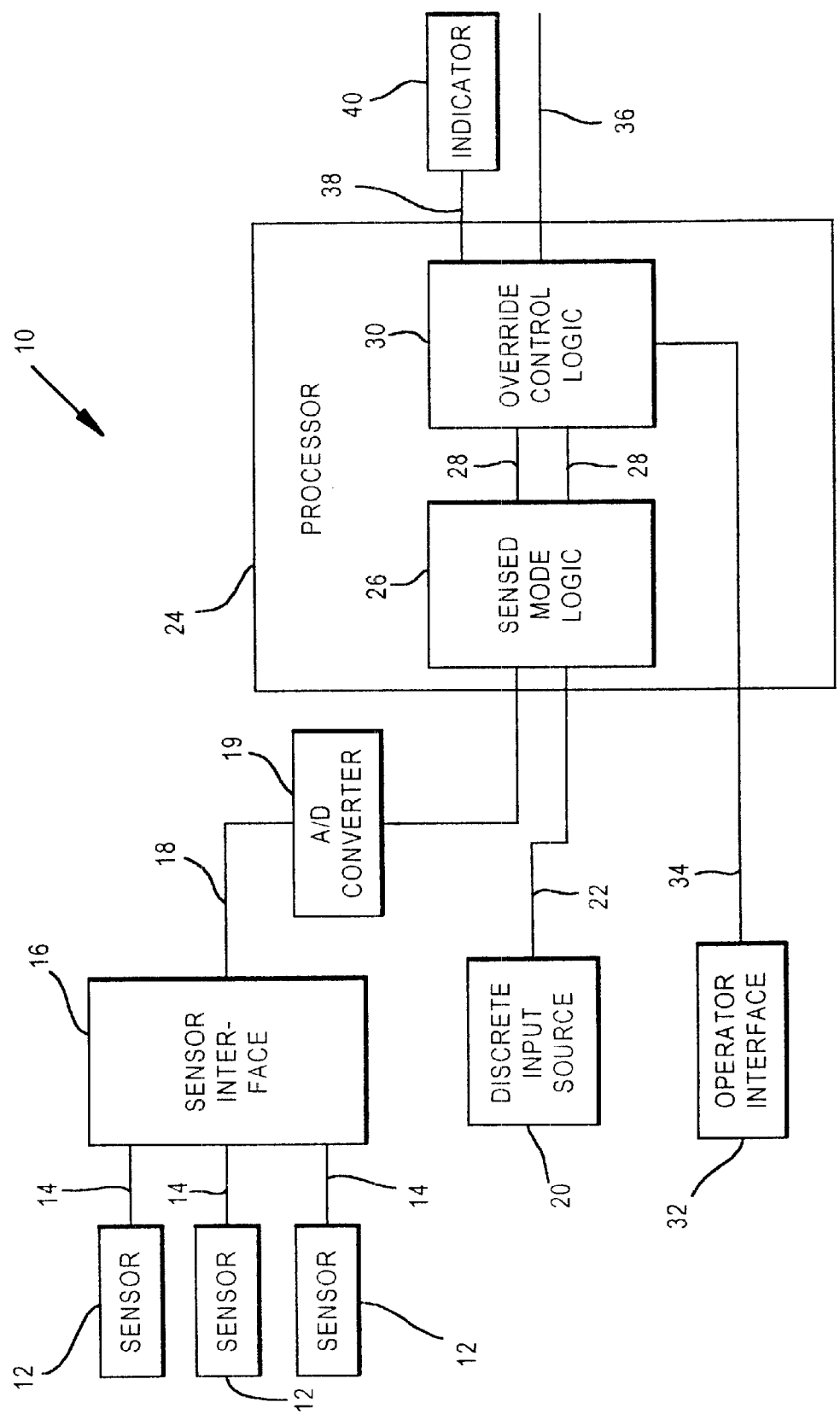
FIG. 1 is a block diagram of a system for simulating air mode and ground mode of an airplane according to the invention.

FIG. 1 shows a system 10 for simulating an air mode and a ground mode of an airplane. The air mode is a state of the airplane when the airplane is in the air, and the ground mode is a state of the airplane when the airplane is on the ground. The system 10 includes sensors 12 for sensing parameters that are indicative of whether the airplane is sensed in the air or sensed on the ground. A processor 24 includes sensed mode logic 26 for determining whether the airplane is sensed in the air or sensed on the ground in response to the parameters sensed by the sensors 12. The sensed mode logic 26 outputs signals 28 that are indicative of a sensed air mode or a sensed ground mode. A simulated air mode and a simulated ground mode are selectable by an operator via an operator interface 32. Override control logic 30 outputs signals 36 that are indicative of the simulated air mode or the simulated ground mode in response to a selection from the operator interface 32. If desired, the override control logic 30 outputs a signal 38 that drives an indicator 40 for indicating a discrepancy between the sensed mode and the simulated mode. When the simulated air mode or the simulated ground mode is not selected, the signals 36 are indicative of the sensed air mode or the sensed ground mode.

Figure 2:
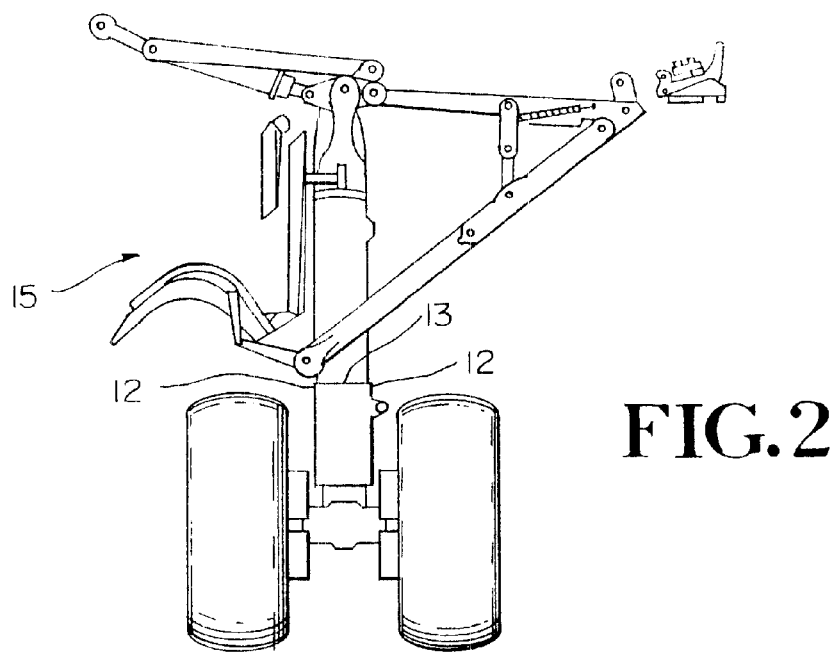
FIG. 2 is a front view of a main landing gear of an airplane.
Figure 3:
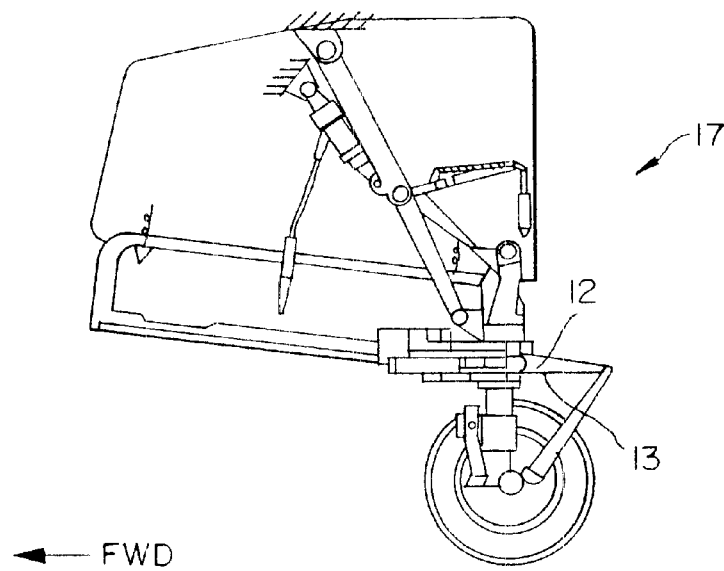
FIG. 3 is a side view of a nose gear of an airplane.

Referring now to FIGS. 2 and 3, the sensors 12 are located on torsion links 13 on the main landing gear 15 (FIG. 2) and the nose gear 17 (FIG. 3). The sensors 12 sense compression of the main landing gear 15 (FIG. 2) and the nose gear 17 (FIG. 3) due to weight of the airplane. The sensors 12 function as metal detectors. The sensors 12 are preferably inductive metal detectors, such as variable reactance proximity sensors. The sensors 12 are also suitably Hall Effect sensors, such as magnetic proximity sensors. However, performance of Hall Effect sensors, such as magnetic proximity sensors, is degraded at low temperatures, such as those encountered at high altitudes. Accordingly, variable reactance proximity sensors are presently preferred. A metal target (not shown) is located near each sensor 12. When the airplane is on the ground, the main landing gear 15 (FIG. 2) and the nose gear 17 (FIG. 3) compress, and each target is caused to approach its associated sensor 12. When the metal target enters the sensing range of its associated senor 12, inductance of the sensor 12 is changed, This condition is referred to as "target near." When a metal target is outside the sensing range of its associated sensor 12, this condition is referred to as "target far."

Referring back to FIG. 1, output signals 14 from the sensors 12 are provided to a sensor interface 16. The sensor interface 16 demodulates the output signals 14. The sensor interface 16 determines the displacement of each metal target to its associated sensor 12. This determines whether the sensor 12 is in a target near condition or a target far condition. The sensor interface 16 provides demodulated signal 18 to an analog-to-digital converter 19.

If desired, discreet sources 20 may provide discreet information, as desired. For example, discreet input may be desired to verify proper operation of the system 10. By way of non-limiting example of discreet input, status of the airplane's parking brake may be sensed and checked against the status of the sensors 12.

The processor 24 implements the sensed mode logic 26 and the override control logic 30. The processor 24 suitably includes a known microprocessor, such as, without limitation, a Motorola MC68332 microprocessor (not shown), nonvolatile memory (not shown) for program storage, and volatile and nonvolatile memory (not shown) for data storage. These processor components are well known in the art, and further explanation of their construction and operation is not necessary for an understanding of the invention.

Figure 4:
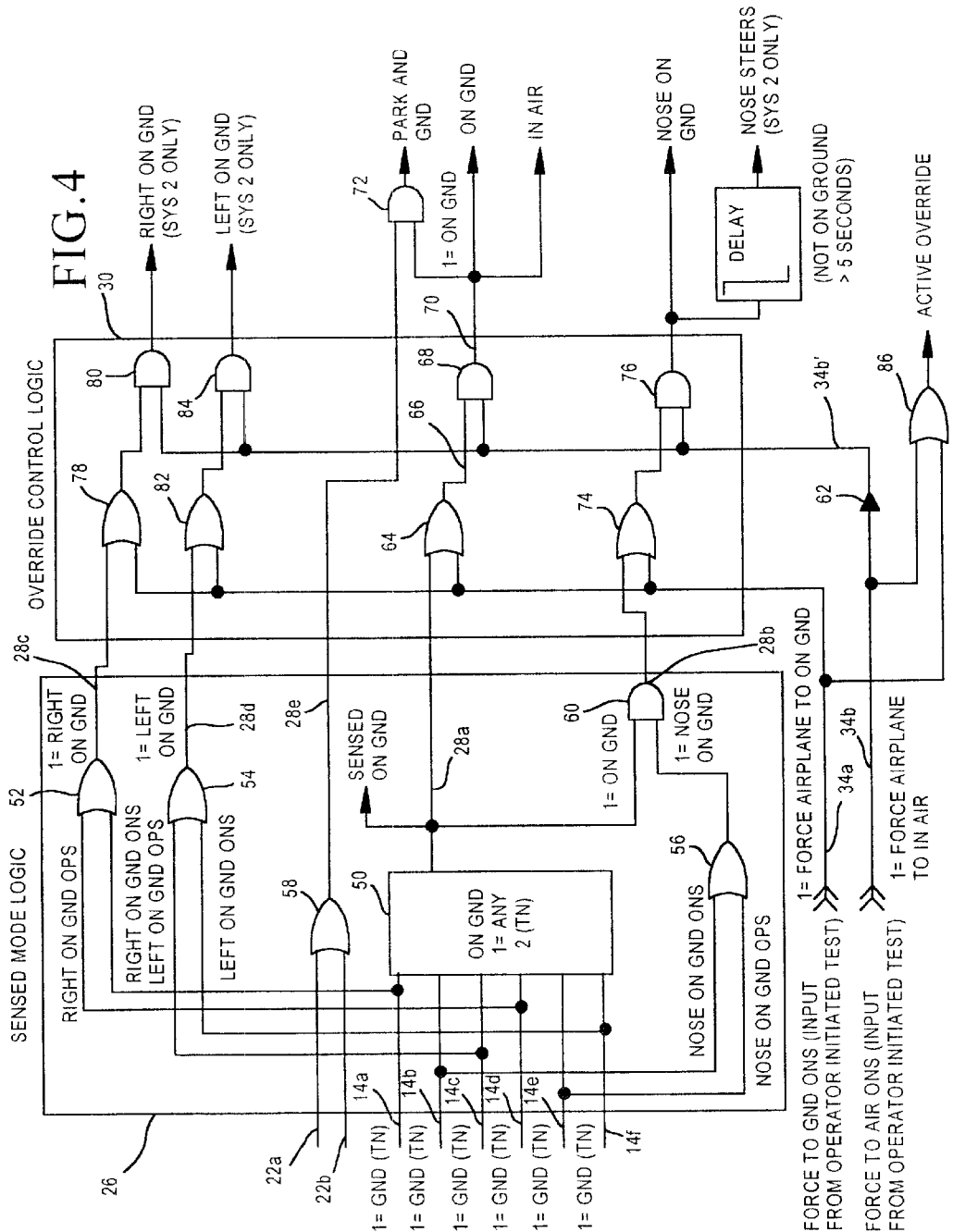
FIG. 4 is a detailed block diagram of logic implemented by the invention.

FIG. 4 shows a detailed block diagram of the sensed mode logic 26 and the override control logic 30 implemented within the processor 24, Output signals 14 from the sensors 12 are input as desired to the sensed mode logic 26. By way of non limiting example, the following signals are provided: signal 14a is input from the right main landing gear; signal 14b is input from the nose gear, signal 14c is input from the left main landing gear; signal 14d is input from the right main landing gear; signal 14e is input from the nose gear; and signal 14f is input from the left main landing gear. These signals 14a–14f are provided to logic block 50, which outputs a signal 28a that has a logic level one when any two of the signals 14a–14f indicate a target near condition for the associated sensors 12, If desired the signals 14a and 14d may be provided to logic block 52, which outputs a signal 28c that has a logic level one when either of the right main landing gear are sensed on the ground and the associated sensors 12 are in a target near status. Similarly, if desired, the signals 14c and 14f may be provided to logic block 54, which outputs a signal 28d that has a logic level one when either of the left main landing gear are sensed on the ground and the associated sensors 12 are in a target near status. Similarly, if desired, the signals 14b and 14e may be provided to logic block 56, which outputs a logic one signal when either of the nose gear are sensed on the ground and the associated sensors 12 are in a target near status.

If it is desired to input information from discreet input sources 20, signals 22a and 22b are input from the parking brake to logic block 58, which outputs a signal 28e that has a logic level one when either the signal 22a or the signal 22b is a logic level one.

The signal 28a is a signal indicative of whether the airplane is sensed on the ground or sensed in the air, and is input to logic block 60, which also receives the output from the logic block 56. The logic block 60 outputs a signal that is a logic one when the signal 28a is high (sensed on ground) and the output from logic block 56 is also high. Signals 34a and 34b are input to the override control logic 30 from the operator interface 32 (FIG. 1). It will be appreciated that the operator interface 32 (FIG. 1) is suitably any conventional interface device such as, without limitation, a keypad, keyboard, or pointing device, and also includes a suitable display device. The signal 34a is a logic one signal when the operator selects a simulated ground mode, and the signal 34b is a logic one signal when the operator selects a simulated air mode. Signal 34b is input to logic block 62, that inverts the signal 34b and outputs signal 34b'.

The signal 28a and the signal 34a are input to logic block 64, that outputs a signal 66 that has a logic level one when either the signal 28a (sensed on ground) or the signal 34a (simulated ground mode) is a logic one. The signal 66 is input to a logic block 68 that also receives the signal 34b '. The logic block 68 outputs a signal 70 that is a logic one when both the signal 66 (sensed on ground or simulated ground mode) and the signal 34b ' (not simulated air mode) are both logic one level signals. It will be appreciated that the sensed mode logic 26 and the override control logic 30 operate according to the same logic regarding sensed air mode and simulated air mode signals.

When information is provided from the discreet input source 20, the signal 28c and the signal 70 are provided to logic block 72, that outputs a logic one signal when both the signal 28e and the signal 70 are high. Also, the signal 28b and the signal 34a are provided to logic block 74, that outputs a logic one signal when either the signal 28b or the sign 34a are logic one signals. The output from logic block 74 and the signal 34b ' are provided to logic block 76, that outputs a logic one signal when both outputs from the logic block 74 and the signal 34b ' are logic one signals. The signal 28c and the signal 34a are provided to logic block 78, that outputs a signal that is a logic level one when either the signal 28c or the signal 34a are logic one signals. The output from the logic block 78 and the signal 34b ' are input to logic block 80 that outputs a logic level one signals. Similarly, the signal 28d and the signal 34a are provided to logic block 82, that outputs a logic level one signal when either the signal 28d or the signal 34a are logic level one signals. The output from logic block 82 and the signal 34b ' are input to logic block 64, that outputs a logic level one signal when both the output from the logic block 82 and the signal 34b ' are logic level one signals. Finally, the signal 34a and the signal 34b are provided to logic block 86, that outputs a logic level one signal when either the ignal 34a or the signal 34b is a logic level one signal, that is, the simulated ground mode or die simulated air It will be appreciated by those skilled in the art that the sensed mode logic 26 and the override control Ionic 30 are suitably implemented in software or as logic circuit elements. It will be appreciated that software implementation of the sensed mode logic 26 and the override control logic 30 is presently preferred because of increased flexibility and reliability inherent in software implementation.

Figure 5:
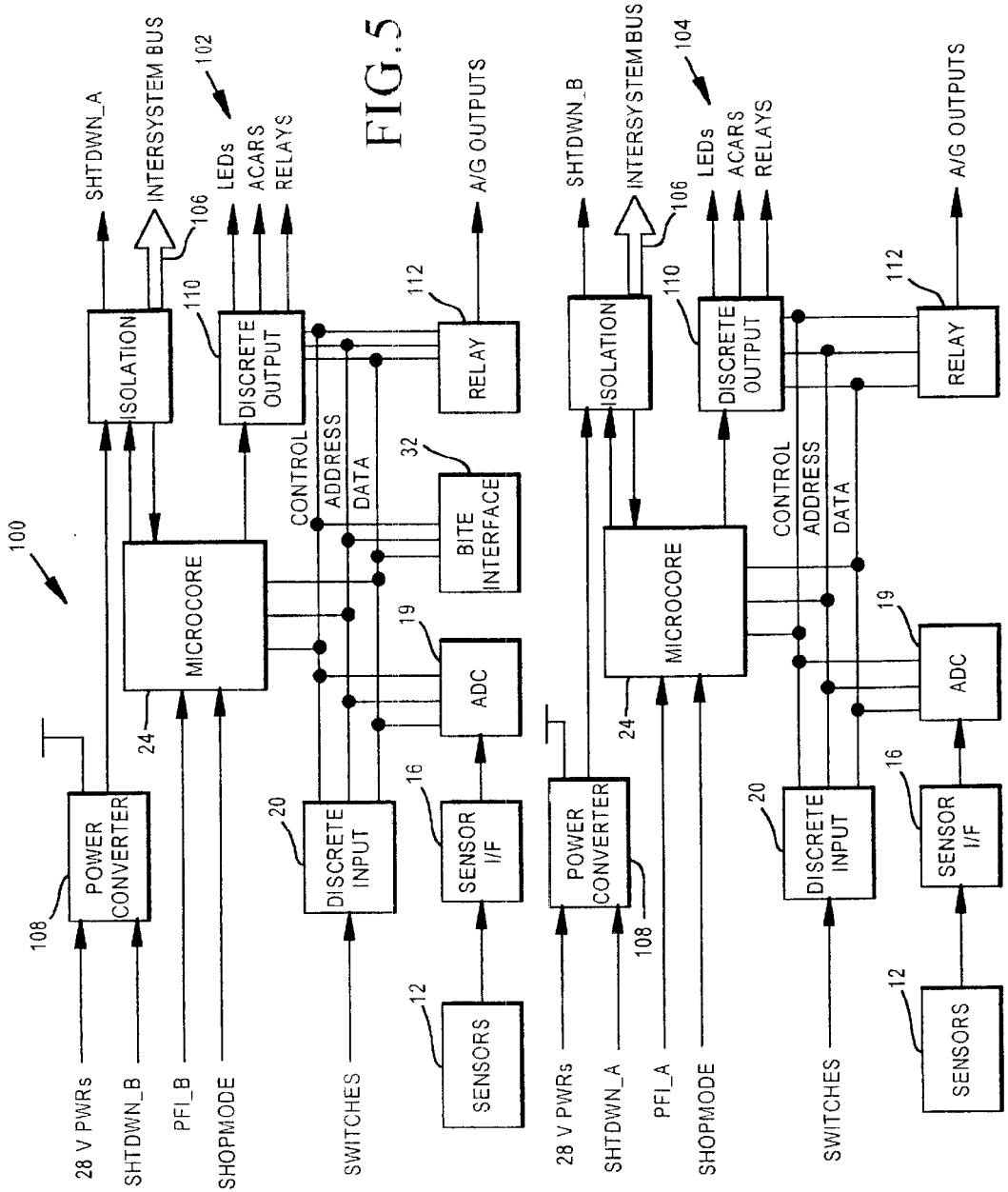
FIG. 5 is a block diagram of a system implementing the invention.

FIG. 5 shows a block diagram of a system 100 that implements the invention, For redundancy and reliability purposes, the system 100 includes subsystem 102 and subsystem 104 that are interconnected via an inter system bus 106. A power converter 108 provides a source of power, such as 28 VDC input power, to the system 100. The power converter 108 ORs together two sources of electrical power, such as 28 VDC input power, and allows either power input to operate both subsystems 102 and 104 in the event of loss of one of the sources of 28 VDC input power.

The sensors 12, the sensor interface 16, the analog-to-digital converter 19, the discreet input source 20, the processor 24, and the operator interface 32 are described above, and details of their construction and operation need not be repeated for an understanding of the invention. The operator interface 32 is included within the subsystem 102, and interfaces with the subsystem 104 via the intersystem bus 106, Discreet output circuits 110 receive the output signal from the processor 24 and provide high current output to drive devices such as lamps, eternal relays, and solenoids. The discreet output circuit 110 also provides low current digital control signals for airplane applications as desired.

Relay circuits 112 each contain multiple relays that provide information from the sensors 12, demodulated by the sensor interface 16 and digitized in the analogtodigital converter 19, to various airplane systems as desired, each of which uses the information from the sensors 12 to make independent air/ground determinations.

FIG. 6 shows a software routine 112 implemented by the system 100 (FIG. 5). At a block 114, the operator sets a state message for subsystem 102. The state message is found in Table 1. At a block 116, a determination is made whether the operator intends to set the subsystem 102 simulated in the air mode or simulated in the ground mode. At a block 118, the desired simulated air mode or simulated ground mode as selected for the subsystem 102 is set and a message is displayed. Blocks 120, 122, and 124 perform similar functions for the subsystem 104. Blocks 126, 128, and 130 perform similar functions for both subsystems 102 and 104. At a block 132, the operator selects whether to override simulated air mode or simulated ground mode as selected and return to sensed air mode or sensed ground mode. The operator confirms this selection at a block 134. At a block 136, the selected simulated air mode or simulated ground mode is reset, and the sensed air mode or sensed ground mode is selected.

It will be appreciated that, although various embodiments of the invention have been described herein for purposes of illustration, modifications may be made without departing from the invention. Accordingly, the invention is not limited except as by the appended claims.

What is claimed is:

1. A system for enabling an operator to select a signal indicative of an air mode and a ground mode of an airplane, the air mode being a state of the airplane when the airplane is in the air and the ground mode being a state of the airplane when the Airplane is on the ground, the system comprising:
    means for sensing parameters indicative of whether the airplane is sensed in the air or sensed on the ground, the sensing means including a plurality of sensors;
    means for determining whether the airplane is sensed in the air or sense on the ground, the determining means being responsive to the sensing means, tie determining means generating a signal indicative of a sensed ground mode when at least two sensors indicate the airplane is sensed on the ground, and the determining means generating a signal indicative of a sensed air mode when less than two sensors indicate the airplane is sensed on the ground;
    means for interfacing with an operator, an operator selectable air mode and an operator selectable ground mode being selectable via the interface means; and
    means for overriding the signal generated by the determining means, the overriding means outputting a signal indicative of the ground mode when either the determining means generates a signal indicative of a sensed ground mode or the operator selectable ground mode is selected and the operator selectable air mode is not selected, the overriding means outputting a signal indicative of the air mode when either the determining means generates a signal indicative of a sensed air mode or the operator selectable air mode is selected and the operator selectable ground mode is not selected.

2. The system of claim 1, wherein the overriding means outputs a signal indicative of the sensed air mode or the sensed ground mode when neither the operator selectable air mode nor the operator selectable ground mode is selected.

3. The system of claim 1, further comprising means for indicating a discrepancy between the sensed air mode or the sensed ground mode and the operator selectable ground mode or the operator selectable air mode.

4. A system for enabling an operator to select a signal indicative of an air mode and a ground mode of an airplane, the air mode being a state of the airplane when the airplane is in the air and the ground mode being a state of the airplane when the airplane is on the ground, the system comprising:
    a plurality of sensors for sensing parameters indicative of whether the airplane is sensed in the air or sensed on the ground;
    first means for determining whether the airplane is sensed in the air or sensed on the ground, the first determining means being responsive to the plurality of sensors, the first determining means generating a first signal that is indicative of a sensed ground mode when at least two sensors indicate the airplane is sensed on the ground, and the first determining means generating a first signal that is indicative of a sensed air mode when less than two sensors indicate the airplane is sensed on the ground;
    an interface device for interfacing with an operator, an operator selectable air mode and an operator selectable ground mode being selectable via the interface device; and
    first means for overriding the first signal generated by the first determining means, the first overriding means outputting a first signal that is indicative of the ground mode when either the first determining means generates a fist signal indicative of a sensed ground mode or the operator selectable ground mode is selected and the operator selectable air mode is not selected, the first overriding means outputting a first signal that is indicative of the air mode when either the first determining means generates a first signal indicative of a sensed air mode or the operator selectable air mode is selected and the operator selectable ground mode is not selected.

5. The system of claim 4, further comprising:

second means for determining whether the airplane is sensed in the air or sensed on the ground, the second determining means being responsive to the plurality of sensors, the second determining means generating a second signal that is indicative of a sensed ground mode when at least two sensors indicate the airplane is sensed on the ground, the second determining means operating a second signal that is indicative of a sensed air mode when less than two sensors indicate the airplane is sensed on the ground;

second means for overriding tie second signal generated by the second determining means, the second overriding means outputting a second signal than is indicative of the ground mode when either the second determining means generates a second signal indicative of a sensed ground mode or the operator selectable ground mode is selected and the operator selectable air mode is not selected, the overriding means outputting a second signal that is indicative of the air mode when either the second determining means generates a second signal indicative of a sensed air mode or the operator selectable air mode is selected and the operator selectable ground mode is not selected; and means for interconnecting the first and second determining means, the first and second overriding means, and the interface device.

6. The system of claim 5 wherein the first overriding means outputs a first signal that is indicative of the sensed air mode or the sensed ground mode when neither the operator selectable air mode nor the operator selectable ground mode is selected; and wherein the second overriding means outputs a second signal that is indicative of the sensed air mode or the sensed ground mode when neither the operator selectable air mode nor the operator selectable ground mode is selected.

* * * * *